(12) United States Patent
Xu et al.

(10) Patent No.: US 11,319,251 B2
(45) Date of Patent: May 3, 2022

(54) NICKEL-COATED HEXAGONAL BORON NITRIDE NANOSHEET COMPOSITE POWDER, PREPARATION AND HIGH PERFORMANCE COMPOSITE CERAMIC CUTTING TOOL MATERIAL

(71) Applicant: QILU UNIVERSITY OF TECHNOLOGY, Jinan (CN)

(72) Inventors: Chonghai Xu, Jinan (CN); Guangyong Wu, Jinan (CN); Guangchun Xiao, Jinan (CN); Mingdong Yi, Jinan (CN); Zhaoqiang Chen, Jinan (CN); Jingjie Zhang, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 86 days.

(21) Appl. No.: 16/765,131

(22) PCT Filed: Nov. 8, 2019

(86) PCT No.: PCT/CN2019/116680
§ 371 (c)(1),
(2) Date: May 18, 2020

(87) PCT Pub. No.: WO2020/155737
PCT Pub. Date: Aug. 6, 2020

(65) Prior Publication Data
US 2021/0214280 A1    Jul. 15, 2021

(30) Foreign Application Priority Data

Jan. 29, 2019 (CN) .......................... 201910084610.7
Jan. 29, 2019 (CN) .......................... 201910085214.6

(51) Int. Cl.
*C04B 35/117* (2006.01)
*B26D 1/00* (2006.01)
(Continued)

(52) U.S. Cl.
CPC .......... *C04B 35/117* (2013.01); *B26D 1/0006* (2013.01); *C04B 35/6261* (2013.01);
(Continued)

(58) Field of Classification Search
CPC ........ C04B 35/62842; C04B 35/62886; C04B 35/6303; C04B 2235/386;
(Continued)

(56) References Cited

FOREIGN PATENT DOCUMENTS

| CN | 107413370 A | * | 12/2017 | ............. B82Y 40/00 |
| KR | 101493937 B1 | * | 2/2015 | ............. B01J 19/10 |
| WO | WO-2018014494 A1 | * | 1/2018 | .......... B01J 19/0013 |

* cited by examiner

*Primary Examiner* — Noah S Wiese
(74) *Attorney, Agent, or Firm* — CBM Patent Consulting, LLC

(57) ABSTRACT

The invention relates to nickel-coated hexagonal boron nitride nanosheet composite powder, its preparation and high-performance composite ceramic cutting tool material. The composite powder has a core-shell structure with BNNS as the core and Ni as the shell. The self-lubricating ceramic cutting tool material is prepared by wet ball milling mixing and vacuum hot-pressing sintering with a phase alumina as the matrix, tungsten-titanium carbide as the reinforcing phase, nickel-coated hexagonal boron nitride nanosheet composite powder as the solid lubricant and magnesium oxide and yttrium oxide as the sintering aids. The invention also provides preparation methods of the nickel-coated hexagonal boron nitride nanosheet composite powder and the self-lubricating ceramic cutting tool material.

15 Claims, 7 Drawing Sheets

(51) Int. Cl.
*C04B 35/626* (2006.01)
*C04B 35/628* (2006.01)
*C04B 35/63* (2006.01)
*C04B 35/645* (2006.01)
*C23C 18/16* (2006.01)
*C23C 18/18* (2006.01)
*C23C 18/32* (2006.01)

(52) U.S. Cl.
CPC .. *C04B 35/62655* (2013.01); *C04B 35/62842* (2013.01); *C04B 35/62886* (2013.01); *C04B 35/6303* (2013.01); *C04B 35/645* (2013.01); *C23C 18/1692* (2013.01); *C23C 18/1882* (2013.01); *C23C 18/32* (2013.01); *B26D 2001/002* (2013.01); *C04B 2235/3206* (2013.01); *C04B 2235/3217* (2013.01); *C04B 2235/3225* (2013.01); *C04B 2235/386* (2013.01); *C04B 2235/3843* (2013.01); *C04B 2235/3847* (2013.01); *C04B 2235/405* (2013.01); *C04B 2235/5292* (2013.01); *C04B 2235/6581* (2013.01)

(58) Field of Classification Search
CPC ...... C04B 2235/405; C04B 2235/5292; C04B 2235/5445; C23C 18/1882; C23C 18/32
See application file for complete search history.

NICKEL-COATED HEXAGONAL BORON NITRIDE NANOSHEET COMPOSITE POWDER, PREPARATION AND HIGH PERFORMANCE COMPOSITE CERAMIC CUTTING TOOL MATERIAL

TECHNICAL FIELD

The invention relates to a nickel-coated hexagonal boron nitride nanosheet composite powder, a preparation method and application thereof and a self-lubricating ceramic cutting tool material added with nickel-coated hexagonal boron nitride nanosheet composite powder, belonging to the technical field of ceramic cutting tool materials.

BACKGROUND ART

Since graphene was discovered in 2004, the research on two-dimensional layered inorganic materials has rapidly risen and made rapid progress. In view of their incomparable excellent properties compared with corresponding three-dimensional bulk materials, two-dimensional materials have been widely used in more and more fields. Hexagonal boron nitride nanosheets are graphene-like two-dimensional materials, that is, a single layer or a few layers of hexagonal boron nitride. Due to the small size effect in the thickness direction, hexagonal boron nitride nanosheet has significantly better mechanical properties than traditional hexagonal boron nitride, and has good high temperature oxidation resistance and high chemical stability. It is expected to be a new solid lubricant for the preparation of metal-based and ceramic-based solid self-lubricating composites with higher mechanical properties.

The traditional method of preparing metal-based and ceramic-based solid self-lubricating composites is to directly add the solid lubricant powders to the matrix material powders for mixing and sintering. But, the direct addition of hexagonal boron nitride nanosheets will have a great negative impact on the properties of the prepared solid self-lubricating composites: (1) For metal-based solid self-lubricating composites, on the one hand, because the hexagonal boron nitride nanosheet has poor wettability with the metal matrix, the interface bonding strength between the two is low. On the other hand, because the density of hexagonal boron nitride nanosheet is much smaller than that of the metal matrix, segregation inevitably occurs in the mixing process. These two aspects will harm the mechanical properties and friction and wear properties of the composites. (2) For ceramic-based solid self-lubricating composites, because hexagonal boron nitride is a covalent bond compound and has low solid phase diffusion coefficient at high temperature (Refer to Journal of the Chinese ceramic society, 1998, 26(2): 265-269), the direct addition of hexagonal boron nitride nanosheet is likely to result in low bonding strength and difficulty in sintering and densification with ceramic matrix and further lead to the reduction of the mechanical and frictional properties of composites are reduced. For this purpose, the hexagonal boron nitride nanosheets need to be coated.

At present, the preparation methods of metal coated two-dimensional material composite powders mainly include the following: (1) Self-assembly method: Chinese patent document CN103265950A discloses a method of loading gold nanoclusters onto hexagonal boron nitride nanosheets by self-assembly method. The disadvantage of this method is that the contact between gold nanoclusters and boron nitride nanosheets is mainly physical adsorption, and the binding force between the two is lower. (2) Radiation reduction method: CN107413370A discloses a method for preparing hexagonal boron nitride nanosheets loaded with metal nanoparticles by gamma ray irradiation of hexagonal boron nitride dispersion containing metal ions. The problem with this method is that radioactive gamma rays radiation are used, which has potential safety risks to the health of operators. (3) Liquid phase chemical reduction method: CN103203462A discloses a method for preparing boron nitride nanosheet-silver nanoparticle composite materials by reducing silver nitrate with hydrazine hydrate. The disadvantage of this method is that because the boron nitride nanosheet does not have catalytic activity, the reduced silver particles cannot be spontaneously deposited on its surface, resulting in fewer silver particles attached to the boron nitride nanosheet and uneven size. (4) Solid phase chemical reduction method: firstly, $Ni(OH)_2$ particles are grown by heterogeneous nucleation on the surface of graphene oxide, and then calcined for 2 h at 500° C. in flowing argon. Refer to Journal of Power Sources, 2012, 209:1-6. The disadvantage of this method is that it requires high temperature heating, the price of the rare gas used is higher, and the reduction of NiO into Ni particles using graphene as the carbon source will affect the surface structure of graphene. (5) In-situ chemical vapor deposition: first, $Ni(NO_3)_2 \cdot 6H_2O$ is used as the nickel source, glucose is used as the carbon source, NaCl is used as the template, and the composite powder is prepared by freeze drying, and then calcined for 2 h at 700° C. in hydrogen. Refer to Materials Science and Engineering A, 2017, 699:185-193. The disadvantage of this method is that the process is relatively complicated, and needs to be calcined in hydrogen at high temperature, which has a certain risk of operation.

Chinese patent document CN106623908A provides a method for preparation of nickel-coated hexagonal boron nitride composite powder, but the method is suitable for coating micron-sized hexagonal boron nitride and not suitable for coating hexagonal boron nitride nanosheets. The main problems are: (1) The specific surface area of hexagonal boron nitride nanosheet is much larger than that of hexagonal boron nitride powder, and it is not easily dispersed. Therefore, it is necessary to carry out sensitization under ultrasonic conditions for a long time, which will lead to the oxidation of $Sn^{2+}$ ions in the sensitization solution, and then losing the sensitizing effect; (2) Under the conditions of high pH value and high temperature, the long-term plating of hexagonal boron nitride nanometer sheet with large specific surface area is very easy to make the plating speed surge out of control, causing the plating solution to decompose and fail and then the failure of electroless plating; (3) When plating is carried out at a higher temperature, the evaporation amount of water in the plating solution increases, which significantly reduces the volume of the plating solution and increases the concentration of the hexagonal boron nitride nanosheet, thus easily causing agglomeration and then affecting the coating effect; (4) When plating at higher temperature, the decomposition trend of hydrazine hydrate in the plating solution increases and the volatilization amount increases, which makes the stability of the plating solution decrease and harms the operating environment.

In recent years, with the continuous improvement of the overall strength of China's equipment manufacturing industry, rapid development has been achieved in the development of advanced equipment represented by high-speed rail transit equipment, large aircraft and high-efficiency precision machine tools, followed by the development and application of hard-to-machine materials such as high hardness, high strength, high temperature resistance, corrosion resistance, etc. At the same time, social progress has put forward the requirements of high efficiency, energy saving and environmental protection for the processing and manufacturing industry, which has promoted the advanced cutting technology such as high-speed dry cutting and hard cutting. Due to the large amount of cutting heat and extremely high mechanical stress generated when cutting hard-to-machine materials with advanced technology, the cutting tools are prone to serious wear or failure, thus posing severe challenges to the performance of the cutting tools. Due to the large amount of cutting heat and extremely high mechanical stress generated when cutting hard-to-machine materials with advanced technology, the cutting tools are prone to serious wear or failure, thus posing severe challenges to the performance of cutting tools. Traditional cutting tools such as high speed steel cutting tools and cemented carbide cutting tools are far from competent, and the application effect of coated cemented carbide cutting tool and common ceramic cutting tool is not satisfactory.

Self-lubricating ceramic cutting tool is an advanced cutting tool material developed for the above machining requirements. The cutting tool material is made of ceramic materials with high hardness, wear resistance, high temperature resistance, chemical inertness and other advantages as a matrix, and is sintered after solid lubricant is added. In the cutting process, the solid lubricant contained in the cutting tool material is precipitated and coated on the cutting surface of the cutting tool to form a lubricating film. It can effectively reduce the friction coefficient between the cutting tool and the workpiece as well as the chip, respectively, thereby reducing the cutting temperature and the resulting tool thermal wear. However, due to the low mechanical properties of traditional solid lubricants, the mechanical properties, especially the hardness, of self-lubricating ceramic cutting tools, are significantly reduced, which cannot meet the cutting requirements of most difficult-to-machine materials. The difficult problem that the antifriction property and mechanical properties of self-lubricating ceramic cutting tools cannot be taken into account greatly limits their popularization and application.

Aiming at the above problem, a new type of self-lubricating ceramic cutting tool material added with metal coated solid lubricant composite powders has been developed in recent years. Calcium fluoride and hexagonal boron nitride are two kinds of solid lubricants commonly used in the preparation of self-lubricating ceramic materials. Chinese patent document CN106810259A provides a kind of self-lubricating ceramic cutting tool material with the addition of nickel-phosphorus alloy coated calcium fluoride composite powders; CN106904947A discloses a self-lubricating ceramic cutting tool material added with nickel-coated hexagonal boron nitride composite powders. The above patent applications improve the interface performance between the solid lubricant and the ceramic matrix by coating metal to achieve the purpose of toughening and strengthening, so that the mechanical properties of the self-lubricating ceramic cutting tool material prepared by this method are significantly higher than that of the corresponding self-lubricating ceramic cutting tool material added with the uncoated solid lubricant. However, the disadvantages of the technical solutions of the patent documents are that they fail to overcome the defect of low mechanical properties of calcium fluoride and hexagonal boron nitride, resulting in that the mechanical properties of the self-lubricating ceramic cutting tool materials still need to be further improved.

Contents of the Invention

In order to overcome the defects of the prior technologies, in particular to solve the technical problem of metal-coated hexagonal boron nitride nanosheet, the invention provides nickel-coated hexagonal boron nitride nanosheet (BNNS@Ni) composite powder and a preparation method thereof. The composite powder has a core-shell structure with BNNS as the core and Ni as the shell, and can be used for preparing metal-based or ceramic-based solid self-lubricating composite materials.

The invention also provides a self-lubricating ceramic cutting tool material added with nickel-coated hexagonal boron nitride nanosheet composite powder and a preparation method thereof. A new type of solid lubricant with high mechanical properties is developed and applied to solve the problem that the antifriction property and mechanical properties of the self-lubricating ceramic cutting tools in the prior technologies cannot be taken into consideration.

Terminology Description

BNNS: refers to hexagonal boron nitride nanosheet, which is the initial raw material of the solid lubricant of the present invention.

BNNS@Ni: nickel-coated hexagonal boron nitride nanosheets. Among them, BNNS is the core and Ni is the shell.

PVP: Polyvinylpyrrolidone.

The technical scheme adopted by the invention is as follows:

Nickel-coated hexagonal boron nitride nanosheet (BNNS@Ni) composite powder which has a core-shell structure with BNNS as the core and Ni as the shell.

According to a preferred embodiment of the present invention, the Ni particles in the nickel-coated hexagonal boron nitride nanosheet composite powder are uniform in size and uniformly coated on the surface of BNNS.

According to a preferred embodiment of the present invention, the average sheet diameter of BNNS in the nickel-coated hexagonal boron nitride nanosheet composite powder is 100-800 nm and the average sheet thickness is 1-7 nm.

According to the present invention, the preparation method of the nickel-coated hexagonal boron nitride nanosheet (BNNS@Ni) composite powder comprises the following steps:

(1) The BNNS powder is proportionally weighed, added into an appropriate amount of isopropanol ($C_3H_8O$), ultrasonically dispersed for 20-30 min, and then centrifugally separated to obtain dispersed BNNS powder;

(2) The dispersed BNNS powder obtained in step (1) is added into the sensitizing solution, ultrasonically oscillated and stirred for 10-15 min, centrifugally separated after the tin particles in the sensitizing solution are filtered out, and washed once with distilled water to obtain sensitized BNNS powder;

The components of the sensitizing solution are: 10-15 g/L of stannous chloride dihydrate ($SnCl_2 \cdot 2H_2O$), the balance is isopropanol, and 3-5 g/L of tin particles are added;

(3) The sensitized BNNS powder obtained in step (2) is added into the activating solution, ultrasonically oscillated and stirred for 10-20 min, centrifugally separated and washed to neutrality with distilled water to obtain activated BNNS powder. Then it is added into a proper amount of PVP solution, ultrasonically oscillated and stirred for 5-10 min to prepare activated BNNS suspension, which is sealed for later use;

The components of the activating solution are: 0.2-0.5 g/L of palladium chloride ($PdCl_2$), 5-10 mL/L of concentrated hydrochloric acid, 5-10 mg/L of polyvinylpyrrolidone (PVP), and the balance is distilled water (i.e. distilled water is used for constant volume).

(4) Electroless plating solution is prepared, and the components of the electroless plating solution are: 15-25 g/L of nickel sulfate hexahydrate ($NiSO_4.6H_2O$), 50-60 g/L of ethylenediamine tetraacetic acid disodium dihydrate ($Na_2C_{10}H_{14}N_2O_8.2H_2O$), 40-50 g/L of ammonium sulfate (($NH_4)_2SO_4$), 15-25 mL/L of the first dose of hydrazine hydrate ($N_2H_4.H_2O$), 5-10 mg/L of polyvinylpyrrolidone (PVP), 0.2-0.5 mg/L of potassium iodide (KI), an appropriate amount of pH adjuster makes the pH value of the electroless plating solution at 10-11, and the balance is distilled water; In addition, 15-25 mL/L of the second dose of equal amount of hydrazine hydrate is prepared for later use;

The activated BNNS suspension obtained in step (3) is added into the prepared electroless plating solution. First, the plating is carried out for 5-10 min in a constant temperature water bath at 85-90° C. and under ultrasonic oscillation condition, then the second dose of hydrazine hydrate is added dropwise under stirring condition. Afterwards the plating is carried out in a constant temperature water bath at 50-60° C. and under ultrasonic oscillation condition, and the pH adjuster is dripped at any time to keep the pH value of the electroless plating solution at 10-11;

(5) After the plating in step (4) is completed, the solid particles are centrifugally separated and washed to neutrality with distilled water, then washed with absolute ethanol for 2-3 times, and dried in a vacuum drying oven at 30-40° C. for 10-15 h to obtain nickel-coated hexagonal boron nitride nanosheet (BNNS@Ni) composite powder.

According to a preferred embodiment of the present invention, the sensitizing solution in step (2) is prepared by the following method: $SnCl_2.2H_2O$ is weighed in proportion, added into an appropriate amount of isopropanol and stirred for dissolution, then isopropanol is added to the total volume of the sensitizing solution. After ultrasonically oscillating and stirring uniformly, tin particles are added. The invention can effectively prevent the oxidation of $Sn^{2+}$ and improve the sensitizing effect by adding tin particles into the sensitizing solution, so as to be suitable for the sensitization of BNNS powder.

According to a preferred embodiment of the present invention, the average particle size of the tin particles in step (2) is 1-2 mm. The tin particles are analytically pure.

According to a preferred embodiment of the present invention, when the BNNS powder is sensitized in step (2), the addition amount of BNNS powder is 1-2 g/L per liter of the sensitizing solution.

According to a preferred embodiment of the present invention, the activating solution in step (3) is prepared by the following method: $PdCl_2$ is added into concentrated hydrochloric acid in proportion and stirred for dissolution, then distilled water is added to the total volume of the activating solution. Afterwards, PVP is added, ultrasonically oscillated and stirred for dissolution to obtain the activating solution.

According to a preferred embodiment of the present invention, when the BNNS powder is activated in step (3), the addition amount of BNNS powder is 0.5-1 g/L per liter of the activating solution.

According to a preferred embodiment of the present invention, the concentration of the PVP solution in step (3) is 5-10 mg/L. It is prepared with distilled water.

According to a preferred embodiment of the present invention, in step (4), the pH adjuster of the electroless plating solution is NaOH solution with a mass fraction of 7-8%.

According to a preferred embodiment of the present invention, in step (4), the components of the electroless plating solution are: 20 g/L of nickel sulfate hexahydrate, 55 g/L of ethylenediamine tetraacetic acid disodium dihydrate, 45 g/L of ammonium sulfate, 20 mL/L of the first dose of hydrazine hydrate, 7 mg/L of PVP, 0.3 mg/L of potassium iodide, an appropriate amount of pH adjuster makes the pH value of the electroless plating solution at 10-11, and the balance is distilled water; In addition, 20 mL/L of the second dose of equal amount of hydrazine hydrate is prepared for later use;

The electroless plating process in step (4) of the present invention is carried out in two stages, a high-temperature stage at 85-90° C. and a low-temperature stage at 50-60° C. The required amount of hydrazine hydrate for electroless plating is added twice, that is, ½ amount of hydrazine hydrate is added when the electroless plating solution is prepared, and another ½ amount of hydrazine hydrate is added at the end of the high-temperature plating stage.

According to a preferred embodiment of the present invention, the preparation steps of the electroless plating solution in step (4) are as follows:

1) $NiSO_4.6H_2O$ and $Na_2C_{10}H_{14}N_2O_8.2H_2O$ are proportionally weighed, respectively added into an appropriate amount of distilled water, ultrasonically oscillated and stirred for dissolution to obtain $NiSO_4.6H_2O$ solution and $Na_2C_{10}H_{14}N_2O_8.2H_2O$ solution, respectively;

2) Under ultrasonically oscillating and stirring conditions, $NiSO_4.6H_2O$ solution is slowly added into $Na_2C_{10}H_{14}N_2O_8.2H_2O$ solution to obtain solution a;

3) $(NH_4)_2SO_4$ is weighed in proportion, added into the solution a, ultrasonically oscillated and stirred for dissolution to obtain solution b;

4) NaOH is weighed in proportion, added into distilled water measured in proportion, ultrasonically oscillated and stirred for dissolution to prepare NaOH solution with mass fraction of 7-8%;

5) Under the conditions of ultrasonically oscillating and stirring, the NaOH solution obtained in step 4) is added dropwise into the solution b until the pH value reaches 10-11 to obtain solution c;

6) The first dose of hydrazine hydrate is measured in proportion, dripped into the solution c under the conditions of ultrasonically oscillating and stirring, and then distilled water is added to the total volume of the electroless plating solution to obtain solution d;

7) PVP and KI are weighed in proportion, added into the solution d successively, ultrasonically oscillated and stirred for dissolution to obtain the electroless plating solution.

According to a preferred embodiment of the present invention, during the electroless plating in step (4), the addition amount of BNNS powder is 0.2-0.5 g/L per liter of the electroless plating solution.

According to a preferred embodiment of the present invention, the average sheet diameter of the BNNS powder in step (1) is 100-800 nm and the average sheet thickness is 1-7 nm. Further preferably, the average sheet diameter of the BNNS powder is 200-450 nm and the average sheet thickness is 2-6 nm; Most preferably, the average sheet diameter of the BNNS powder is 200-350 nm, and the average sheet thickness is 3-6 nm. The BNNS powder is a commercially available product or prepared according to the prior technology. The chemical reagents such as stannous chloride dihydrate, isopropanol used in the present invention are all commercially available products and preferably analytically pure, wherein the concentration of concentrated hydrochloric acid is 35-37% by mass, the concentration of hydrazine hydrate is 50-80% by mass, and the specification of PVP is k15-30.

According to the present invention, the application of the nickel-coated hexagonal boron nitride nanosheet composite powder (BNNS@Ni) is used as a solid lubricant in self-lubricating ceramic cutting tool materials.

According to the present invention, a self-lubricating ceramic cutting tool material added with nickel-coated hexagonal boron nitride nanosheet composite powder, which is prepared by wet ball milling mixing and vacuum hot-pressing sintering with a phase alumina ($\alpha$-$Al_2O_3$) as the matrix, tungsten-titanium carbide ((W,Ti)C) as the reinforcing phase, magnesium oxide (MgO) and yttrium oxide ($Y_2O_3$) as the sintering aids. It is characterized by the addition of nickel-coated boron nitride nanosheet (BNNS@Ni) composite powder as a solid lubricant;

The mass percentage content of each component is: 28-50% of $\alpha$-$Al_2O_3$, 46-70% of (W,Ti)C, 0.2-3% of nickel-coated hexagonal boron nitride nanosheet composite powder based on the mass of BNNS in the composite powder, 0.4-1% of MgO and 0.4-1% of $Y_2O_3$. Wherein, the BNNS@Ni composite powder is a core-shell structure composite powder with BNNS as the core and Ni as the shell. The average sheet diameter of the BNNS is 100-800 nm and the average sheet thickness is 1-7 nm.

According to a preferred embodiment of the present invention, the BNNS@Ni composite powder is prepared by the following method:

The BNNS powder is dispersed in isopropanol, firstly sensitized in sensitizing solution, then activated in activating solution to obtain activated BNNS powder, finally the activated BNNS suspension is prepared;

Electroless plating solution is prepared, and the components of the electroless plating solution are: 15-25 g/L of nickel sulfate hexahydrate ($NiSO_4 \cdot 6H_2O$), 50-60 g/L of ethylenediamine tetraacetic acid disodium dihydrate ($Na_2C_{10}H_{14}N_2O_8 \cdot 2H_2O$), 40-50 g/L of ammonium sulfate (($NH_4)_2SO_4$), 15-25 mL/L of the first dose of hydrazine hydrate ($N_2H_4 \cdot H_2O$), 5-10 mg/L of polyvinylpyrrolidone (PVP), 0.2-0.5 mg/L of potassium iodide (KI), an appropriate amount of pH adjuster makes the pH value of the electroless plating solution at 10-11, and the balance is distilled water; In addition, 15-25 mL/L of the second dose of equal amount of hydrazine hydrate is prepared for later use;

The activated BNNS suspension was added into the prepared electroless plating solution, first, the plating is carried out for 5-10 min at 85-90° C., and then the second dose of hydrazine hydrate is added, afterwards the plating is carried out at 50-60° C. and the pH adjuster is added dropwise at any time to keep the pH value of the electroless plating solution at 10-11; After the plating is completed, separation and cleaning are performed to obtain BNNS@Ni composite powder.

According to a preferred embodiment of the present invention, the average particle sizes of the above-mentioned $\alpha$-$Al_2O_3$ powder, (W,Ti)C powder, MgO powder and $Y_2O_3$ powder are 0.2-1 μm, 1-1.5 μm, 1-2 μm, and 0.5-1 μm, respectively; All of them have the purity of greater than 99% and are commercial available products.

According to a preferred embodiment of the present invention, the above-mentioned self-lubricating ceramic cutting tool material added with nickel-coated hexagonal boron nitride nanosheet composite powder, wherein the mass percentage of each component is: 30-46% of $\alpha$-$Al_2O_3$, 51-68% of (W,Ti)C, 0.2-1% of BNNS@Ni based on the mass of BNNS in the composite powder, 0.5-1% of MgO, and 0.5-1% of $Y_2O_3$; The sum of the components is 100%.

Further preferably, the self-lubricating ceramic cutting tool material added with nickel-coated hexagonal boron nitride nanosheet composite powder, wherein the mass percentage of each component is: 32.6-32.7% of $\alpha$-$Al_2O_3$, 65-67% of (W,Ti)C, 0.3-0.4% of BNNS@Ni based on the mass of BNNS in the composite powder, 0.5% of MgO, and 0.5% of $Y_2O_3$; The sum of the components is 100%.

According to the present invention, the preparation method of the self-lubricating ceramic cutting tool material added with nickel-coated hexagonal boron nitride nanosheet composite powder comprises the following steps:

(1) Preparation of sensitizing solution: stannous chloride dihydrate is weighed in proportion, added into an appropriate amount of isopropanol and stirred for dissolution, then isopropanol is added to the total volume of the sensitizing solution. After ultrasonically oscillating and stirring uniformly, sensitizing solution is obtained, and then 3-5 g of tin particles are added to prevent the oxidation of $Sn^{2+}$;

The BNNS powder is proportionally weighed, added into an appropriate amount of isopropanol and ultrasonically dispersed for 20-30 min. After centrifugal separation, the powder is added into the sensitizing solution, ultrasonically oscillated and stirred for 10-15 min, centrifugally separated after the tin particles are filtered out, and washed once with distilled water to obtain sensitized BNNS powder.

(2) Preparation of activating solution: $PdCl_2$ is added into concentrated hydrochloric acid in proportion and stirred for dissolution, then distilled water is added to the total volume of the activating solution. Afterwards, polyvinylpyrrolidone is added in proportion, ultrasonically oscillated and stirred for dissolution to obtain activating solution;

The sensitized BNNS powder obtained in step (1) is added into the activating solution, ultrasonically oscillated and stirred for 10-20 min, centrifugally separated and washed to neutrality with distilled water to obtain activated BNNS powder. Then it is added into a proper amount of polyvinylpyrrolidone solution, ultrasonically oscillated and stirred for 5-10 min to prepare activated BNNS suspension, which is sealed for later use;

(3) The activated BNNS suspension obtained in step (2) is added into the electroless plating solution. First, the plating is carried out for 5-10 min in a constant temperature water bath at 85-90° C. and under ultrasonic oscillation condition, then the second dose of hydrazine hydrate is added dropwise under stirring condition. Afterwards the plating is carried out in a constant temperature water bath at 50-60° C. and under the condition of ultrasonic oscillation, and the pH adjuster is dripped at any time to keep the pH value of the electroless plating solution at 10-11; After the plating is completed, the solid particles are centrifugally separated and washed to neutrality with distilled water, and then washed with absolute ethanol for 2-3 times to obtain BNNS@Ni composite powder. Then the BNNS@Ni composite powder is added into polyvinylpyrrolidone absolute ethanol solution, ultrasonically oscillated and stirred for 5-10 min to prepare BNNS@Ni suspension, which is sealed for later use;

(4) The $\alpha$-$Al_2O_3$ powder and (W,Ti)C powder are weighed in proportion, and added into an appropriate amount of absolute ethanol, respectively, then ultrasonically dispersed and stirred for 15-20 min to prepare $\alpha$-$Al_2O_3$ suspension and (W,Ti)C suspension; The two suspensions are mixed, and then MgO and $Y_2O_3$ powders are added in proportion, ultrasonically dispersed and stirred for 10-15 min to obtain a multiphase suspension;

(5) The multiphase suspension obtained in step (4) is poured into a ball milling tank, added with cemented carbide milling balls according to the weight ratio of ball to material of 9-12:1, and ball milled for 45-50 h under the protective atmosphere of nitrogen;

(6) The BNNS@Ni suspension obtained in step (3) is ultrasonically dispersed and stirred for 5-10 min, added into the ball milling tank in step (5), and ball milling is continued for 1.5-3 h under the protective atmosphere of nitrogen to obtain ball milled slurry;

(7) The ball milled slurry obtained in step (6) is dried in vacuum and sieved to obtain a mixed powder;

(8) The mixed powder obtained in step (7) is loaded into a graphite mold, cold pressed for molding, and put into a vacuum hot-pressing sintering furnace for hot-pressing sintering.

According to a preferred embodiment of the present invention, during the electroless plating in step (3), the addition amount of BNNS powder is 0.2-0.5 g/L per liter of the electroless plating solution.

According to a preferred embodiment of the present invention, in step (3), the composition of the polyvinylpyrrolidone absolute ethanol solution is 0.5-1 g/L of polyvinylpyrrolidone, and the balance is absolute ethanol.

According to a preferred embodiment of the present invention, in step (3), the pH adjuster is a NaOH solution with a mass fraction of 7-8%.

According to a preferred embodiment of the present invention, the drying and sieving in step (7) is to dry in a vacuum drying oven at 60-70° C. for 30-35 h, and pass through a 100-200 mesh sieve to obtain a mixed powder.

According to a preferred embodiment of the present invention, in step (8), the hot-pressing sintering process conditions are: the heating rate is 15-25° C./min, the holding temperature is 1500-1600° C., the holding time is 15-25 min, and the hot-pressing pressure is 25-30 MPa.

The chemical reagents such as stannous dihydrate chloride and isopropanol used in the present invention are all commercially available products, and preferably analytically pure, wherein the concentration of concentrated hydrochloric acid is 35-37% by mass, the concentration of hydrazine hydrate is 50-80% by mass, the specification of polyvinylpyrrolidone is k15-30, and the average particle size of tin particles is 1-2 mm.

Compared with the prior technologies, the invention has the following advantages:

1. Compared with the existing technology for preparing metal-coated two-dimensional material composite powder, the Ni particles in the BNNS@Ni composite powder prepared by the invention are uniform in size, more uniformly coated on the surface of the BNNS, and have stronger binding force with the BNNS. In addition, the preparation method of the invention has simple process, simple equipment, simple operation and low cost. Moreover, it does not require high-temperature heating or calcination in hazardous gas, has no radioactive material, and has high operational safety.

2. Compared with the existing technology for preparing nickel-coated hexagonal boron nitride composite powder (CN106623908A), the invention has the following advantages: (1) Isopropanol is used as the solvent of BNNS sensitizing solution to enhance the wettability of the sensitizing solution to BNNS and improve the sensitizing effect; (2) Tin particles are added into the sensitizing solution to prevent the oxidation of $Sn^{2+}$ in the sensitizing process; (3) Ethylenediamine tetraacetic acid disodium dihydrate is used as the complexing agent, ammonium sulfate as the buffering agent, dispersant PVP and stabilizer KI are added in the electroless plating solution, which improve the stability of the electroless plating solution and the dispersity of the BNNS in the plating solution, thus improving the electroless plating effect; (4) Electroless plating is carried out in two stages of high temperature and low temperature, and hydrazine hydrate is added twice, so that the electroless plating is mainly carried out at low pH value and temperature, which weakens the decomposition trend of hydrazine hydrate in the electroless plating solution and reduces the volatilization amount of the hydrazine hydrate and the evaporation amount of water in the electroless plating solution. It is beneficial to prolong the service life of the plating solution and improve the coating effect and operating environment of the composite powder.

3. The BNNS@Ni composite powder prepared by the invention has a core-shell structure with BNNS as the core and Ni as the shell, and can be used to prepare metal-based or ceramic-based solid self-lubricating composite materials.

4. The addition of BNNS@Ni composite powder in the invention can on one hand improve the dispersion of BNNS in the ceramic matrix, improve the uniformity of microstructure of the ceramic material, and produce a liquid phase in the sintering process, which can improve the sintering density of the self-lubricating ceramic material. On the other hand, the coating metal Ni of BNNS@Ni composite powder can improve the bonding strength between the BNNS and the ceramic matrix, and can also toughen and strengthen the self-lubricating ceramic cutting tool material. The two aspects work together to improve the mechanical properties and cutting performance of the self-lubricating ceramic cutting tool material, so as to successfully solve the problem that the anti-friction performance and mechanical properties of self-lubricating ceramic cutting tools of the prior technologies cannot be taken into account.

5. Compared with the prior technology of preparing self-lubricating ceramic materials by adding nickel-coated hexagonal boron nitride (h-BN@Ni) composite powder, the invention has the following advantages: (1) In the aspect of cutting tool material preparation, isopropanol is used as the solvent of BNNS sensitizing solution to enhance the wettability of the sensitizing solution to BNNS, thus improving the sensitizing effect; Tin particles are added into the sensitizing solution to prevent the oxidation of Sn' in the sensitizing process; ethylenediamine tetraacetic acid disodium dihydrate is used as the complexing agent, ammonium sulfate as the buffering agent, dispersing agent polyvinylpyrrolidone and stabilizing agent potassium iodide are added in the electroless plating solution, which improve the stability of the electroless plating solution and the dispersity of the BNNS in the plating solution, thus improving the electroless plating effect; Electroless plating is carried out in two stages of high temperature and low temperature, and hydrazine hydrate is added twice, so that the electroless plating is mainly carried out at low pH value and temperature, which weakens the decomposition trend of hydrazine hydrate in the electroless plating solution and reduces the volatilization amount of the hydrazine hydrate. It is beneficial to prolong the service life of the plating solution and improve the operating environment. (2) In terms of cutting tool material performance, the invention uses BNNS@Ni composite powder as solid lubricant, and the hexagonal boron nitride nanosheet is a graphene like two-dimensional material, i.e. single-layer or few-layer hexagonal boron nitride. By using the small size effect of BNNS in the thickness direction, the mechanical properties of self-lubricating ceramic materials are fundamentally improved while the self-lubricating property is ensured, so as to realize the unification of anti-friction performance and mechanical properties of self-lubricating ceramic cutting tools.

MODE OF CARRYING OUT THE INVENTION

The technical scheme of the present invention will be further described with reference to the drawings and examples.

Figure 1:
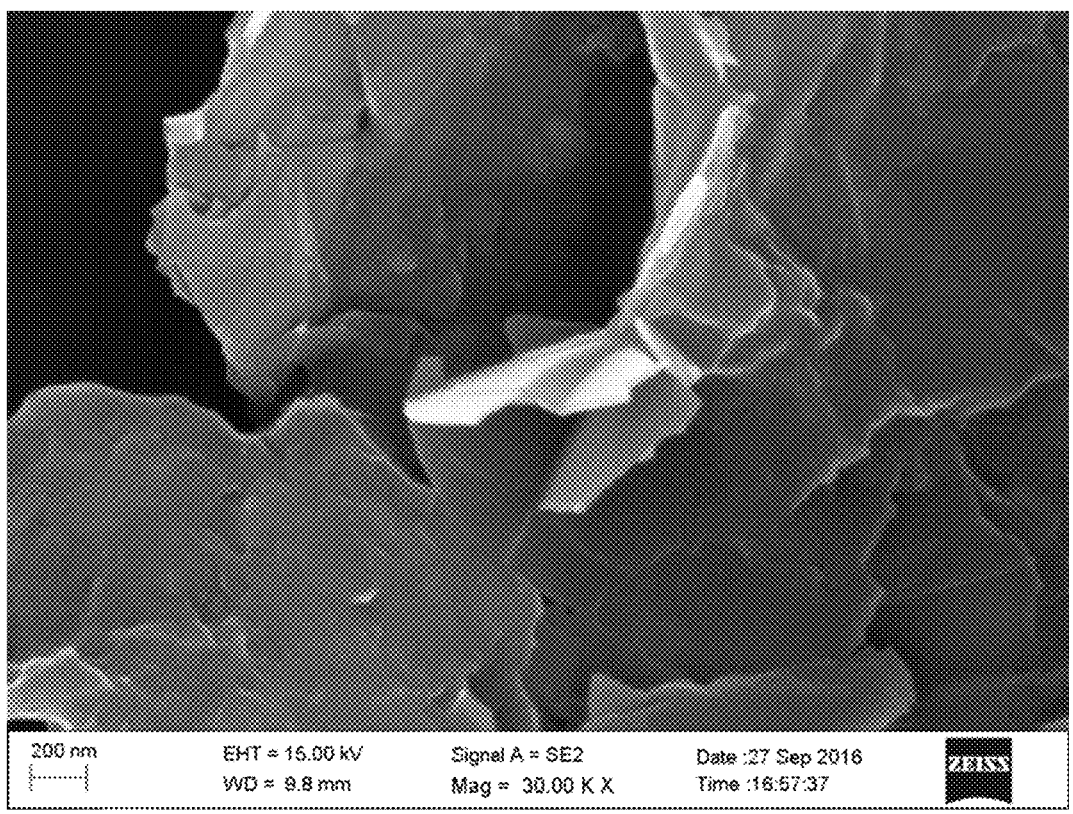
FIG. 1 is scanning electron microscope (SEM) photograph of the BNNS powder used in the examples of the present invention.
Figure 2:
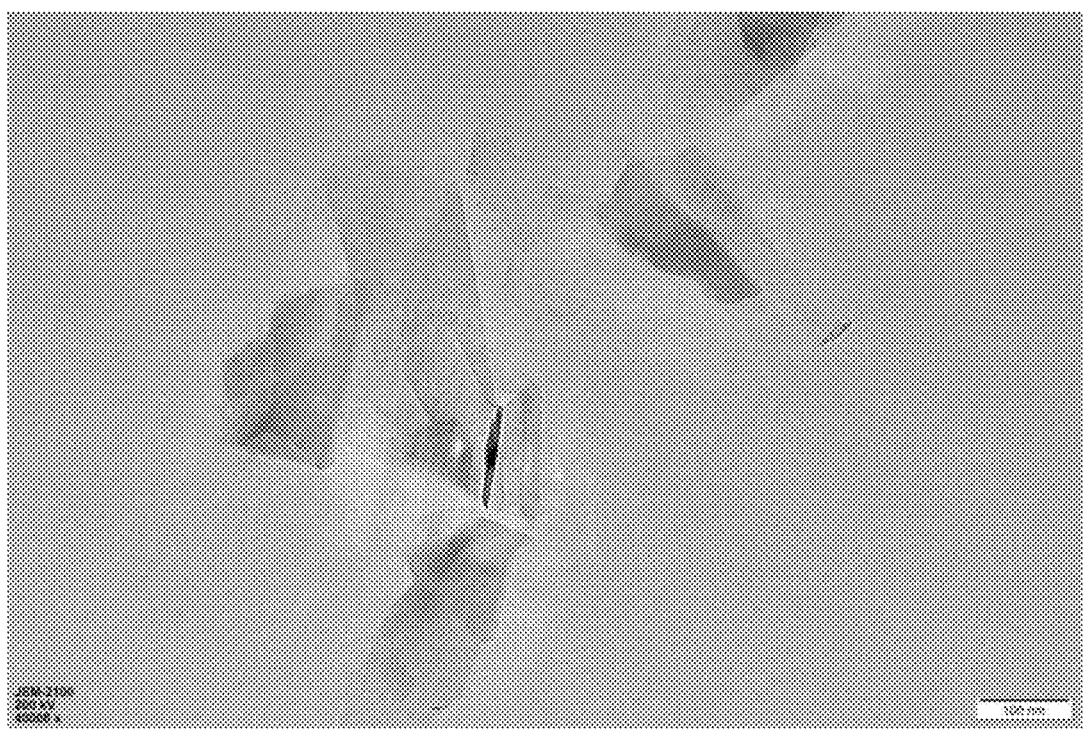
FIG. 2 is transmission electron microscope (TEM) photograph of the BNNS powder used in the examples of the present invention.

The BNNS raw material powder used in the examples is prepared according to the prior technology. The nanosheet diameter of the BNNS raw material powder is 200-350 nm, and the sheet thickness is 3-6 nm. The SEM photograph and TEM photograph of the BNNS raw material powder used are shown in FIG. 1 and FIG. 2, respectively. The preparation method is referred to the example 2 in Chinese patent document CN107716002A, and the steps are as follows:

(1) The ball milling bucket is placed in the working chamber of the oscillating tank, the beam height of the bracket is adjusted, so that the distance between the bottom end of the stirring rod and the bottom of the ball milling bucket is 5 mm;

(2) The milling balls are added into the ball milling bucket. The height of the milling ball layer is ½ of the height of the ball milling bucket. The stirring device is placed, so that the stirring rod extends into the milling ball layer;

(3) Ball milling medium liquid is added into the ball milling bucket, and the liquid level of the ball milling medium liquid is 20 mm higher than the pressing plate; The ball milling medium liquid is isopropanol;

(4) Hexagonal boron nitride (h-BN) raw material powder is added according to the volume of the added ball milling medium liquid, and the concentration of the h-BN raw material powder in the ball milling medium liquid is 3 g/L; The average particle size of the h-BN raw material powder is 10 μm and the purity is greater than 99.9%.

(5) The ultrasonic medium liquid is added into the holding chamber outside the ball milling bucket; The ball milling bucket is fixed by the holder of the bracket, and the ball milling bucket cover is inserted through the central circular hole from the top of the stirring rod, covering the opening of the ball milling bucket, and then the stirring rod and the speed regulating motor are connected with the coupling; The ultrasonic medium liquid is water; The liquid level of the ultrasonic medium liquid in the holding chamber is equal to that of ball milling medium liquid in the ball milling bucket.

(6) The speed regulating motor is started, and the rotating speed is regulated to carry out ball milling; At the same time, the ultrasonic generator is started to perform ultrasonic oscillation; The rotating speed of the speed regulating motor is 1000 r/min, the power is 300 W, and the speed regulating range is 0-3000 r/min with stepless speed regulation. The power of the ultrasonic generator is 200 W and the frequency is 40 kHz; The processing time of ball milling and ultrasonic oscillation is 5 h.

(7) After the ball milling and ultrasonic oscillation in step (6) are completed, the milling balls are separated and the resulting ball milling fluid is centrifuged at a speed of 2500 r/min for 45 min. The upper suspension is taken and centrifuged at a speed of 3500 r/min for 30 min, and the precipitate is taken and dried for 20 h under the vacuum condition of 40° C. to obtain hexagonal boron nitride nanosheet (BNNS) powder.

The rest of raw material powders used in the examples are all commercially available products. The average particle sizes of $\alpha$-$Al_2O_3$ powder, (W,Ti)C powder, MgO powder and $Y_2O_3$ powder are 0.2 μm, 1.5 μm, 2 μm and 1 μm, respectively, and the purity of each is greater than 99%.

The chemical reagents used in the examples are all commercially available and analytically pure, wherein the concentration of concentrated hydrochloric acid is 37% by mass, the concentration of hydrazine hydrate is 80% by mass, the specification of polyvinylpyrrolidone is K30, and the average particle size of tin particles is 1 mm.

Example 1: The preparation method of nickel-coated hexagonal boron nitride nanosheet composite powder comprises the following steps:

(1) Ultrasonic Dispersion 0.35 g of BNNS powder raw material was weighed, added into 300 mL of isopropanol, ultrasonically dispersed for 20 min, and then centrifugally separated to obtain dispersed BNNS powder.

(2) Sensitization 3.5 g of $SnCl_2.2H_2O$ was weighed, added into 100 mL of isopropanol and stirred for dissolution, then isopropanol was added to 350 mL. After ultrasonically oscillating and stirring uniformly, 3 g of tin particles were added to obtain sensitizing solution; The dispersed BNNS powder obtained in step (1) was added into the sensitizing solution, ultrasonically oscillated and stirred for 10 min, centrifugally separated after the tin particles were filtered out, and then washed once with distilled water to obtain sensitized BNNS powder.

(3) Activation 0.15 g of $PdCl_2$ was weighed, added into 3 mL of concentrated hydrochloric acid, stirred for dissolution, then distilled water was added to 500 mL. Afterwards, 2.5 mg of PVP was weighed, ultrasonically oscillated and stirred for dissolution to obtain activating solution; The sensitized BNNS powder obtained in step (2) was added into the activating solution, ultrasonically oscillated and stirred for 10 min, centrifugally separated and washed to neutrality with distilled water to obtain activated BNNS powder;

0.3 mg of PVP was weighed and dissolved in 50 mL of distilled water to obtain PVP solution. Then the activated BNNS powder was added, ultrasonically oscillated and stirred for 5 min to prepare activated BNNS suspension, which was sealed for later use.

(4) Electroless Plating 15 g of $NiSO_4.6H_2O$ and 50 g of $Na_2C_{10}H_{14}N_2O_8.2H_2O$ were weighed, respectively added into 300 mL of distilled water, ultrasonically oscillated and stirred for dissolution to obtain $NiSO_4.6H_2O$ solution and $Na_2C_{10}H_{14}N_2O_8.2H_2O$ solution, respectively; Under ultrasonically oscillating and stirring conditions, $NiSO_4.6H_2O$ solution was slowly added into $Na_2C_{10}H_{14}N_2O_8.2H_2O$ solution to obtain solution a; 40 g of $(NH_4)_2SO_4$ was weighed, added into the solution a, ultrasonically oscillated and stirred for dissolution to obtain solution b; 21 g of NaOH was weighed, added into 279 mL of distilled water, ultrasonically oscillated and stirred for dissolution to prepare NaOH solution with mass fraction of 7%; Under the conditions of ultrasonically oscillating and stirring, the NaOH solution was added dropwise into the solution b until the pH value reached 10 to obtain solution c; 15 mL of hydrazine hydrate was measured, dripped into the solution c under the conditions of ultrasonically oscillating and stirring, and then distilled water was added to 1000 mL to obtain solution d; 5 mg of PVP and 0.2 mg of KI were weighed, added into the solution d successively, ultrasonically oscillated and stirred for dissolution to obtain the electroless plating solution. The activated BNNS suspension obtained in step (3) was added into the electroless plating solution. First, the plating was carried out for 5 min in a constant temperature water bath at 90° C. and under ultrasonic oscillation condition, then 15 mL of hydrazine hydrate was added dropwise under stirring condition. Afterwards the plating was carried out in a constant temperature water bath at 60° C. and under ultrasonic oscillation condition, and the NaOH solution was dripped at any time to keep the pH value of the electroless plating solution at 10.

(5) Drying

After the plating was completed, the solid particles were centrifugally separated and washed to neutrality with distilled water, then washed twice with absolute ethanol, and dried in a vacuum drying oven at 30° C. for 15 h to obtain BNNS@Ni composite powder.

Figure 3:
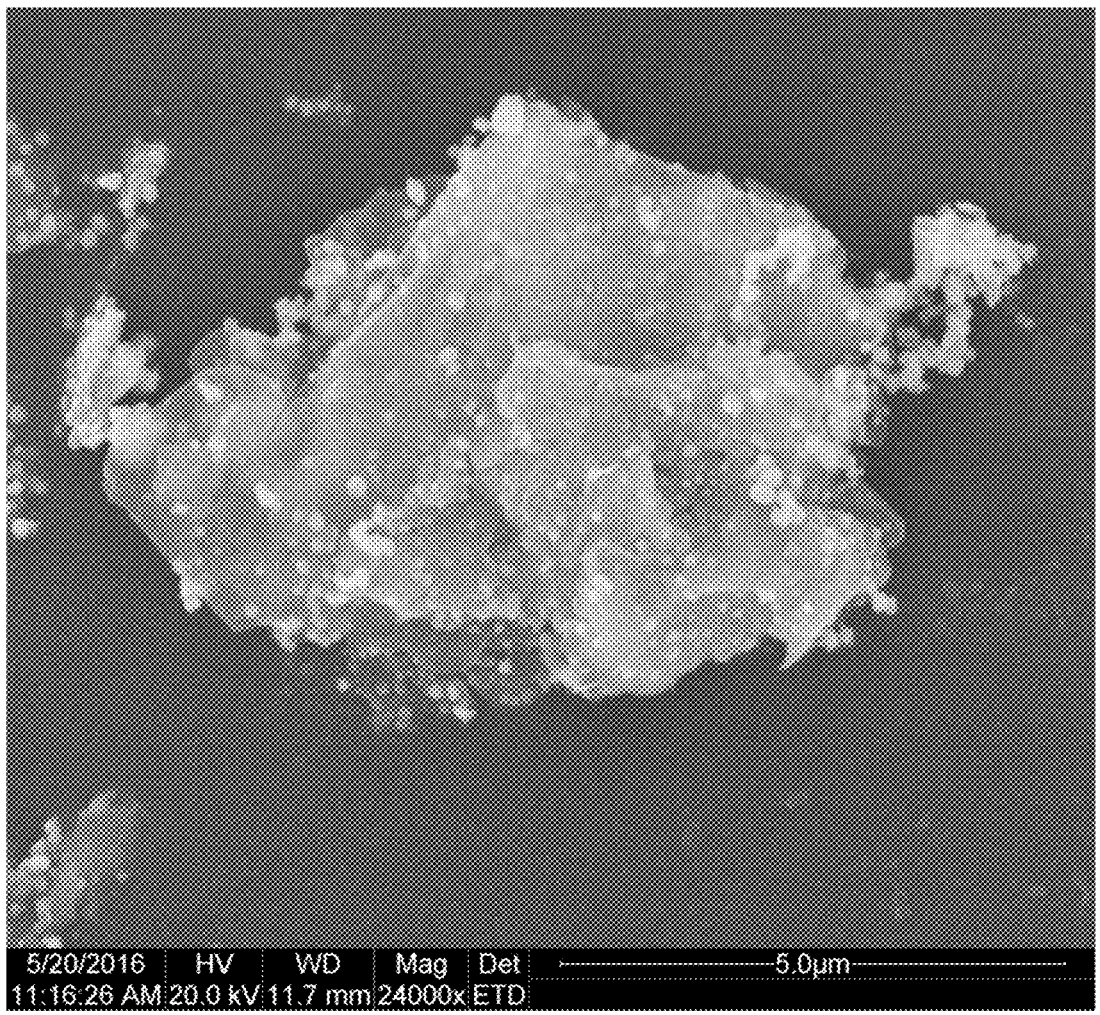
FIG. 3 is SEM photograph of BNNS@Ni composite powder prepared in example 1 of the present invention.
Figure 4:
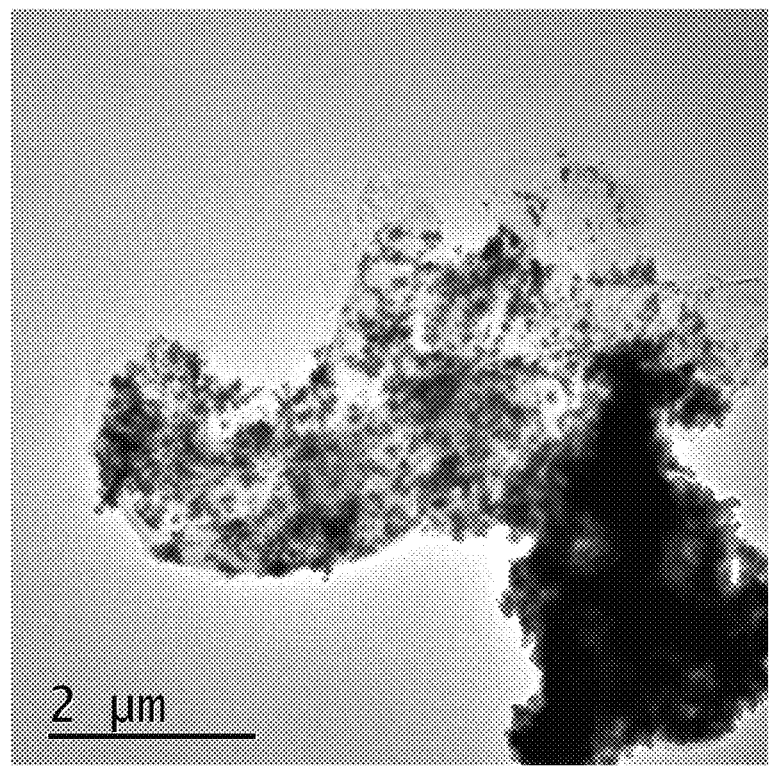
FIG. 4 is TEM photograph of the BNNS@Ni composite powder prepared in example 1 of the present invention.
Figure 5:
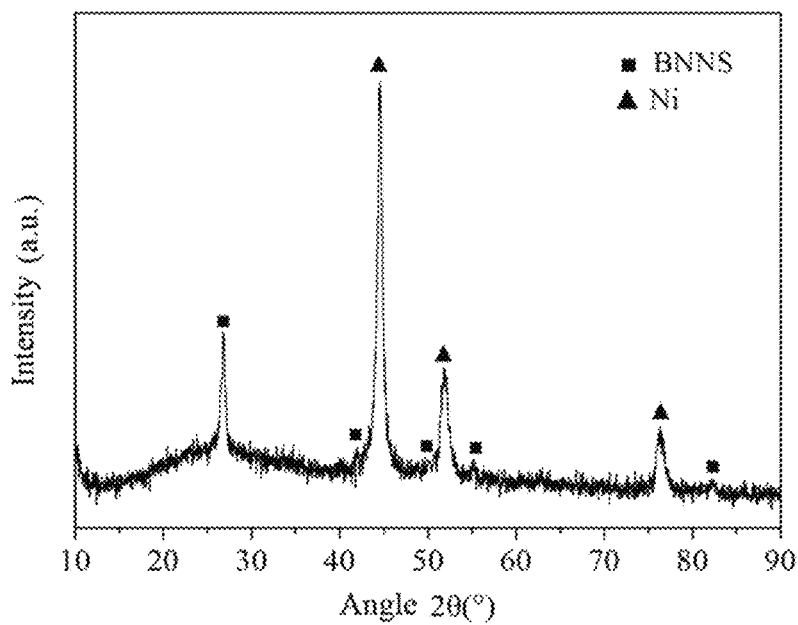
FIG. 5 is X ray diffraction (XRD) pattern of the BNNS@Ni composite powder prepared in example 1 of the present invention.

It can be seen from the SEM photograph in FIG. 1 that the BNNS raw material powder is in a folded sheet shape and is laminated together. It can be seen from FIG. 2 that the TEM image of the BNNS raw material powder is translucent and the edge is curled, indicating that its thickness is very small. It can be seen from FIGS. 3 and 4 that fine particles are distributed on the BNNS surface of the BNNS@Ni composite powder, which is nickel coating. From the XRD pattern in FIG. 5, the diffraction peaks of BNNS and Ni can be clearly seen, indicating that both the BNNS raw material powder and the Ni coating are in crystalline state.

Example 2: The preparation method of nickel-coated hexagonal boron nitride nanosheet composite powder comprises the following steps:

(1) Ultrasonic Dispersion 0.6 g of BNNS powder was weighed, added into 400 mL of isopropanol, ultrasonically dispersed for 25 min, and then centrifugally separated to obtain dispersed BNNS powder.

(2) Sensitization 7 g of $SnCl_2.2H_2O$ was weighed, added into 200 mL of isopropanol and stirred for dissolution, then isopropanol was added to 500 mL. After ultrasonically oscillating and stirring uniformly, 4 g of tin particles were added to obtain sensitizing solution; The dispersed BNNS powder obtained in step (1) was added into the sensitizing solution, ultrasonically oscillated and stirred for 15 min, centrifugally separated after the tin particles were filtered out, and then washed once with distilled water to obtain sensitized BNNS powder.

(3) Activation 0.25 g of $PdCl_2$ was weighed, added into 5 mL of concentrated hydrochloric acid, stirred for dissolution, then distilled water was added to 600 mL. Afterwards, 4.2 mg of PVP was weighed, ultrasonically oscillated and stirred for dissolution to obtain activating solution; The sensitized BNNS powder obtained in step (2) was added into the activating solution, ultrasonically oscillated and stirred for 12 min, centrifugally separated and washed to neutrality with distilled water to obtain activated BNNS powder. 0.6 mg of PVP was weighed and dissolved in 60 mL of distilled water to obtain PVP solution. Then the activated BNNS powder was added, ultrasonically oscillated and stirred for 8 min to prepare activated BNNS suspension, which was sealed for later use.

(4) Electroless Plating 24 g of $NiSO_4.6H_2O$ and 66 g of $Na_2C_{10}H_{14}N_2O_8.2H_2O$ were weighed, respectively added into 350 mL of distilled water, ultrasonically oscillated and stirred for dissolution to obtain $NiSO_4.6H_2O$ solution and $Na_2C_{10}H_{14}N_2O_8.2H_2O$ solution, respectively; Under ultrasonically oscillating and stirring conditions, $NiSO_4.6H_2O$ solution was slowly added into $Na_2C_{10}H_{14}N_2O_8.2H_2O$ solution to obtain solution a; 56 g of $(NH_4)_2SO_4$ was weighed, added into the solution a, ultrasonically oscillated and stirred for dissolution to obtain solution b; 28 g of NaOH was weighed, added into 372 mL of distilled water, ultrasonically oscillated and stirred for dissolution to prepare NaOH solution with mass fraction of 7%; Under the conditions of ultrasonically oscillating and stirring, the NaOH solution was added dropwise into the solution b until the pH value reached 10.5 to obtain solution c; 24 mL of hydrazine hydrate was measured, dripped into the solution c under the conditions of ultrasonically oscillating and stirring, and then distilled water was added to 1200 mL to obtain solution d; 7 mg of PVP and 0.3 mg of KI were weighed, added into the solution d successively, ultrasonically oscillated and stirred for dissolution to obtain the electroless plating solution. The activated BNNS suspension obtained in step (3) was added into the electroless plating solution. First, the plating was carried out for 6 min in a constant temperature water bath at 85° C. and under ultrasonic oscillation condition, then 24 mL of hydrazine hydrate was added dropwise under stirring condition. Afterwards the plating was carried out in a constant temperature water bath at 58° C. and under ultrasonic oscillation condition, and the NaOH solution was dripped at any time to keep the pH value of the electroless plating solution at 10.5.

(5) Drying

After the plating was completed, the solid particles were centrifugally separated and washed to neutrality with distilled water, then washed twice with absolute ethanol, and dried in a vacuum drying oven at 35° C. for 12 h to obtain BNNS@Ni composite powder.

Example 3: The preparation method of nickel-coated hexagonal boron nitride nanosheet composite powder comprises the following steps:

(1) Ultrasonic Dispersion 0.8 g of BNNS powder was weighed, added into 500 mL of isopropanol, ultrasonically dispersed for 30 min, and then centrifugally separated to obtain dispersed BNNS powder.

(2) Sensitization 7.5 g of $SnCl_2.2H_2O$ was weighed, added into 300 mL of isopropanol and stirred for dissolution, then isopropanol was added to 500 mL. After ultrasonically oscillating and stirring uniformly, 5 g of tin particles were added to obtain sensitizing solution; The dispersed BNNS powder obtained in step (1) was added into the sensitizing solution, ultrasonically oscillated and stirred for 15 min, centrifugally separated after the tin particles were filtered out, and then washed once with distilled water to obtain sensitized BNNS powder.

(3) Activation 0.35 g of $PdCl_2$ was weighed, added into 7 mL of concentrated hydrochloric acid, stirred for dissolution, then distilled water was added to 800 mL. Afterwards, 6 mg of PVP was weighed, ultrasonically oscillated and stirred for dissolution to obtain activating solution; The sensitized BNNS powder obtained in step (2) was added into the activating solution, ultrasonically oscillated and stirred for 20 min, centrifugally separated and washed to neutrality with distilled water to obtain activated BNNS powder. 0.7 mg of PVP was weighed and dissolved in 70 mL of distilled water to obtain PVP solution. Then the activated BNNS powder was added, ultrasonically oscillated and stirred for 8 min to prepare activated BNNS suspension, which was sealed for later use.

(4) Electroless Plating 30 g of $NiSO_4.6H_2O$ and 90 g of $Na_2C_{10}H_{14}N_2O_8.2H_2O$ were weighed, respectively added into 500 mL of distilled water, ultrasonically oscillated and stirred for dissolution to obtain $NiSO_4.6H_2O$ solution and $Na_2C_{10}H_{14}N_2O_8.2H_2O$ solution, respectively; Under ultrasonically oscillating and stirring conditions, $NiSO_4.6H_2O$ solution was slowly added into $Na_2C_{10}H_{14}N_2O_8.2H_2O$ solution to obtain solution a; 70 g of $(NH_4)_2SO_4$ was weighed, added into the solution a, ultrasonically oscillated and stirred for dissolution to obtain solution b; 32 g of NaOH was weighed, added into 368 mL of distilled water, ultrasonically oscillated and stirred for dissolution to prepare NaOH solution with mass fraction of 8%; Under the conditions of ultrasonically oscillating and stirring, the NaOH solution was added dropwise into the solution b until the pH value reached 10 to obtain solution c; 38 mL of hydrazine hydrate was measured, dripped into the solution c under the conditions of ultrasonically oscillating and stirring, and then distilled water was added to 1600 mL to obtain solution d; 10 mg of PVP and 0.7 mg of KI were weighed, added into the solution d successively, ultrasonically oscillated and stirred for dissolution to obtain the electroless plating solution. The activated BNNS suspension obtained in step (3) was added into the electroless plating solution. First, the plating was carried out for 8 min in a constant temperature water bath at 87° C. and under ultrasonic oscillation condition, then 38 mL of hydrazine hydrate was added dropwise under stirring condition. Afterwards the plating was carried out in a constant temperature water bath at 56° C. and under ultrasonic oscillation condition, and the NaOH solution was dripped at any time to keep the pH value of the electroless plating solution at 10.

(5) Drying

After the plating was completed, the solid particles were centrifugally separated and washed to neutrality with distilled water, then washed three times with absolute ethanol, and dried in a vacuum drying oven at 40° C. for 10 h to obtain BNNS@Ni composite powder.

Example 4: The self-lubricating ceramic cutting tool material added with nickel-coated hexagonal boron nitride nanosheet composite powder, wherein the raw materials were 0.2 μm α-$Al_2O_3$ powder, 1.5 μm (W,Ti)C powder, 2 μm MgO powder, $Y_2O_3$ powder and BNNS@Ni composite powder prepared in example 1. The mass percentage of each component is: 32.65% of α-$Al_2O_3$, 66% of (W,Ti)C, 0.35% of BNNS@Ni based on the mass of BNNS in the composite powder, 0.5% of MgO, and 0.5% of $Y_2O_3$.

The preparation method is as follows:

(1) 32.65 g of α-$Al_2O_3$ powder and 66 g of (W,Ti)C powder were weighed and added into 200 mL of absolute ethanol, respectively, then ultrasonically dispersed and stirred for 15 min to prepare α-$Al_2O_3$ suspension and (W,Ti)C suspension; the two suspensions were mixed, and then 0.5 g of MgO and 0.5 g of $Y_2O_3$ powders were added, ultrasonically dispersed and stirred for 10 min to obtain a multiphase suspension.

(2) The multiphase suspension obtained in step (1) was poured into a ball milling tank, added with cemented carbide milling balls according to the weight ratio of ball to material of 9:1, and ball milled for 45 h under the protective atmosphere of nitrogen.

(3) 0.05 g of PVP was weighed and dissolved in 100 mL of absolute ethanol to obtain PVP-absolute ethanol solution. Then the BNNS@Ni composite powder was added into the PVP-absolute ethanol solution, ultrasonically oscillated and stirred for 5 min to prepare BNNS@Ni suspension, then added into the ball milling tank in step (2), and ball milling was continued for 2 h under the protective atmosphere of nitrogen to obtain ball milled slurry.

(4) The ball milled slurry obtained in step (3) was dried in a vacuum drying oven at 60° C. for 35 h, and then passed through a 200 mesh sieve to obtain a mixed powder.

(5) The mixed powder obtained in step (4) was loaded into the graphite mold, cold pressed for molding, and put into a vacuum hot-pressing sintering furnace for hot-pressing sintering. The sintering process parameters were: the heating rate was 15° C./min, the holding temperature was 1600° C., the holding time was 15 min, and the hot-pressing pressure was 25 MPa.

Figure 6:
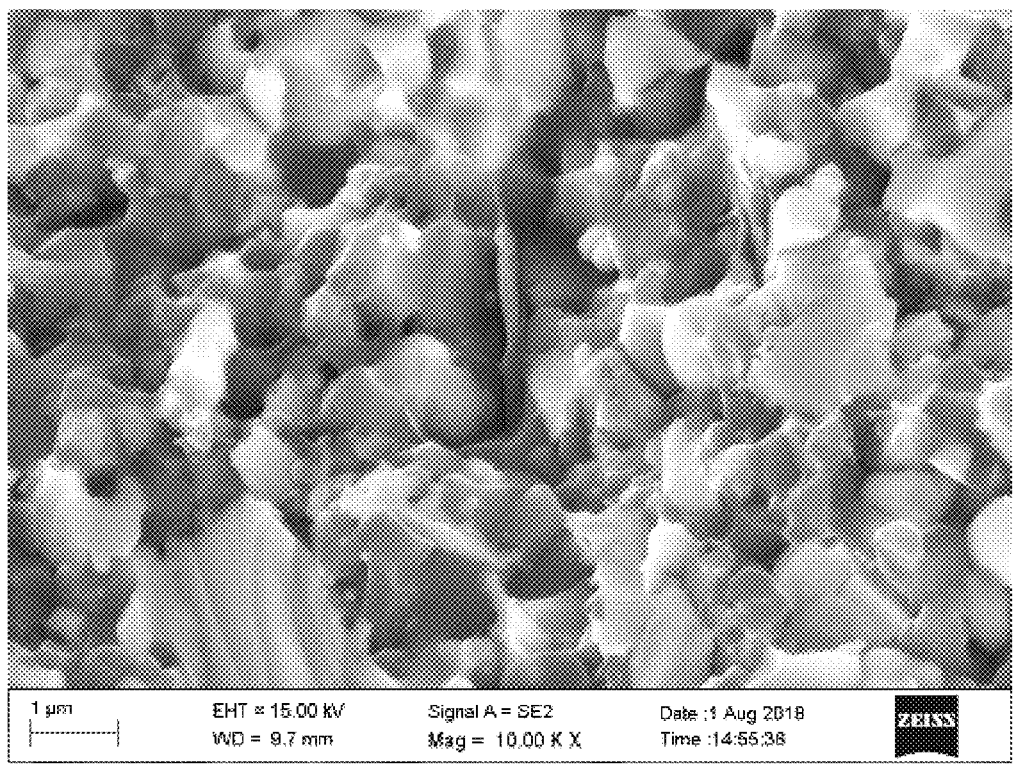
FIG. 6 is scanning electron microscope (SEM) photograph of fracture surface of the self-lubricating ceramic cutting tool material added with BNNS@Ni composite powder prepared in example 4 of the present invention.

The SEM photograph of fracture surface of the obtained self-lubricating ceramic cutting tool material is shown in FIG. 6.

As can be seen from FIG. 6, the self-lubricating ceramic cutting tool material added with BNNS@Ni composite powder prepared in example 4 has dense microstructure. The grain size and distribution of each phase of the ceramic matrix are relatively uniform. The flaky grains are BNNS, which are closely bound with the ceramic matrix grains without obvious pores. The phenomenon of BNNS being pulled off can also be seen, indicating that the bonding strength between the BNNS and the ceramic matrix is relatively large.

According to the tests, the mechanical properties of the self-lubricating ceramic cutting tool material added with BNNS@Ni composite powder prepared in example 4 are: flexural strength 760 MPa, hardness 18.7 GPa, fracture toughness 6.7 MPa·$M^{1/2}$.

Example 5: The self-lubricating ceramic cutting tool material added with nickel-coated hexagonal boron nitride nanosheet composite powder, wherein the mass percentage of each component is: 34% of α-$Al_2O_3$, 64.5% of (W,Ti)C, 0.5% of BNNS@Ni based on the mass of BNNS in the composite powder, 0.5% of MgO, and 0.5% of $Y_2O_3$. The preparation method is as follows:

(1) 6 g of $SnCl_2.2H_2O$ was weighed, added into 200 mL of isopropanol and stirred for dissolution, then isopropanol was added to 500 mL. After ultrasonically oscillating and stirring uniformly, sensitizing solution was obtained, and then 4 g of tin particles were added; 0.5 g of BNNS powder was weighed, added into 400 mL of isopropanol, ultrasonically dispersed for 25 min. After centrifugal separation, the powder was added into the sensitizing solution, ultrasonically oscillated and stirred for 12 min, centrifugally separated after the tin particles were filtered out, and then washed once with distilled water to obtain sensitized BNNS powder.

(2) 0.2 g of $PdCl_2$ was weighed, added into 4 mL of concentrated hydrochloric acid, stirred for dissolution, then distilled water was added to 500 mL. Afterwards, 3.5 mg of polyvinylpyrrolidone was weighed, ultrasonically oscillated and stirred for dissolution to obtain activating solution; The sensitized BNNS powder obtained in step (1) was added into the activating solution, ultrasonically oscillated and stirred for 15 min, centrifugally separated and washed to neutrality with distilled water to obtain activated BNNS powder; 0.6 mg of polyvinylpyrrolidone was weighed and dissolved in 60 mL of distilled water to obtain polyvinylpyrrolidone solution. Then the activated BNNS powder was added, ultrasonically oscillated and stirred for 7 min to prepare activated BNNS suspension, which was sealed for later use.

(3) 20 g of $NiSO_4.6H_2O$ and 55 g of $Na_2C_{10}H_{14}N_2O_8.2H_2O$ were weighed, respectively added into 350 mL of distilled water, ultrasonically oscillated and stirred for dissolution to obtain $NiSO_4.6H_2O$ solution and $Na_2C_{10}H_{14}N_2O_8.2H_2O$ solution, respectively; Under ultrasonically oscillating and stirring conditions, $NiSO_4.6H_2O$ solution was slowly added into $Na_2C_{10}H_{14}N_2O_8.2H_2O$ solution, and then 45 g of $(NH_4)_2SO_4$ were added, ultrasonically oscillated and stirred for dissolution to obtain solution A; 24 g of NaOH was weighed, added into 276 mL of distilled water, ultrasonically oscillated and stirred for dissolution to prepare NaOH solution with mass fraction of 8%; Under the conditions of ultrasonically oscillating and stirring, the NaOH solution was added dropwise into the solution A until the pH value reached 10.5 to obtain solution B; 20 mL of hydrazine hydrate was measured, dripped into the solution B under the conditions of ultrasonically oscillating and stirring, and then distilled water was added to 1000 mL to obtain solution C; 7 mg of polyvinylpyrrolidone and 0.3 mg of potassium iodide were weighed, added into the solution C successively, ultrasonically oscillated and stirred for dissolution to obtain the electroless plating solution. The activated BNNS suspension obtained in step (2) was added into the electroless plating solution. First, the plating was carried out for 7 min in a constant temperature water bath at 87° C. and under ultrasonic oscillation condition, then 20 mL of hydrazine hydrate was added dropwise under the stirring condition. Afterwards the plating was carried out in a constant temperature water bath at 55° C. and under ultrasonic oscillation condition, and the NaOH solution was dripped at any time to keep the pH value of the electroless plating solution at 10.5. After the plating was completed, the solid particles were centrifugally separated and washed to neutrality with distilled water, then washed three times with absolute ethanol to obtain BNNS@Ni composite powder; 0.07 g of polyvinylpyrrolidone was weighed and dissolved in 100 mL of absolute ethanol to obtain polyvinylpyrrolidone absolute ethanol solution. Then the BNNS@Ni composite powder was added into the polyvinylpyrrolidone absolute ethanol solution, ultrasonically oscillated and stirred for 7 min to prepare BNNS@Ni suspension, which was sealed for later use.

(4) 34 g of $\alpha-Al_2O_3$ powder and 64.5 g of (W,Ti)C powder were weighed and added into 200 mL of absolute ethanol, respectively, then ultrasonically dispersed and stirred for 17 min to prepare $\alpha-Al_2O_3$ suspension and (W,Ti)C suspension; the two suspensions were mixed, and then 0.5 g of MgO and 0.5 g of $Y_2O_3$ powders were added, ultrasonically dispersed and stirred for 12 min to obtain a multiphase suspension.

(5) The multiphase phase suspension obtained in step (4) was poured into a ball milling tank, added with cemented carbide milling balls according to the weight ratio of ball to material of 10:1, and ball milled for 47 h under the protective atmosphere of nitrogen.

(6) The BNNS@Ni suspension obtained in step (3) was ultrasonic dispersed and stirred for 7 min, added into the ball milling tank in step (5), and ball milling was continued for 2.5 h under the protective atmosphere of nitrogen to obtain ball milled slurry.

(7) The ball milled slurry obtained in step (6) was dried in a vacuum drying oven at 65° C. for 32 h, and then passed through a 100 mesh sieve to obtain a mixed powder.

(8) The mixed powder obtained in step (7) was loaded into a graphite mold, cold pressed for molding, and put into a vacuum hot-pressing sintering furnace for hot-pressing sintering. The sintering process parameters were: the heating rate was 20° C./min, the holding temperature was 1550° C., the holding time was 20 min, and the hot-pressing pressure was 25 MPa.

According to the tests, the mechanical properties of the self-lubricating ceramic cutting tool material added with BNNS@Ni composite powder prepared in example 5 are: flexural strength 715 MPa, hardness 18.3 GPa, fracture toughness 6.9 $MPa \cdot M^{1/2}$.

Example 6: The self-lubricating ceramic cutting tool material added with nickel-coated hexagonal boron nitride nanosheet composite powder, wherein the mass percentage of each component is: 38.3% of $\alpha-Al_2O_3$, 60% of (W,Ti)C, 0.7% of BNNS@Ni based on the mass of BNNS in the composite powder, 0.5% of MgO, and 0.5% of $Y_2O_3$. The preparation method is as follows:

(1) 7.5 g of $SnCl_2.2H_2O$ was weighed, added into 300 mL of isopropanol and stirred for dissolution, then isopropanol was added to 500 mL. After ultrasonically oscillating and stirring uniformly, sensitizing solution was obtained, and then 5 g of tin particles were added; 0.7 g of BNNS powder was weighed, added into 500 mL of isopropanol, ultrasonically dispersed for 30 min. After centrifugal separation, the powder was added into the sensitizing solution, ultrasonically oscillated and stirred for 15 min, centrifugally separated after the tin particles were filtered out, and then washed once with distilled water to obtain sensitized BNNS powder.

(2) 0.4 g of $PdCl_2$ was weighed, added into 8 mL of concentrated hydrochloric acid, stirred for dissolution, then distilled water was added to 800 mL. Afterwards, 8 mg of polyvinylpyrrolidone was weighed, ultrasonically oscillated and stirred for dissolution to obtain activating solution; The sensitized BNNS powder obtained in step (1) was added into the activating solution, ultrasonically oscillated and stirred for 20 min, centrifugally separated and washed to neutrality with distilled water to obtain activated BNNS powder; 0.7 mg of polyvinylpyrrolidone was weighed and dissolved in 70 mL of distilled water to obtain polyvinylpyrrolidone solution. Then the activated BNNS powder was added, ultrasonically oscillated and stirred for 10 min to prepare activated BNNS suspension, which was sealed for later use.

(3) 45 g of $NiSO_4.6H_2O$ and 108 g of $Na_2C_{10}H_{14}N_2O_8.2H_2O$ were weighed, respectively added into 650 mL of distilled water, ultrasonically oscillated and stirred for dissolution to obtain $NiSO_4.6H_2O$ solution and $Na_2C_{10}H_{14}N_2O_8.2H_2O$ solution, respectively; Under ultrasonically oscillating and stirring conditions, $NiSO_4.6H_2O$ solution was slowly added into $Na_2C_{10}H_{14}N_2O_8.2H_2O$ solution, and then 90 g of $(NH_4)_2SO_4$ were added, ultrasonically oscillated and stirred for dissolution to obtain solution A; 42 g of NaOH was weighed, added into 558 mL of distilled water, ultrasonically oscillated and stirred for dissolution to prepare NaOH solution with mass fraction of 7%; Under the conditions of ultrasonically oscillating and stirring, the NaOH solution was added dropwise into the solution A until the pH value reached 11 to obtain solution B; 45 mL of hydrazine hydrate was measured, dripped into the solution B under the conditions of ultrasonically oscillating and stirring, and then distilled water was added to 1800 mL to obtain solution C; 18 mg of polyvinylpyrrolidone and 0.9 mg of potassium iodide were weighed, added into the solution C successively, ultrasonically oscillated and stirred for dissolution to obtain the electroless plating solution. The activated BNNS suspension obtained in step (2) was added into the electroless plating solution. First, the plating was carried out for 10 min in a constant temperature water bath at 85° C. and under ultrasonic oscillation condition, then 45 mL of hydrazine hydrate was added dropwise under the stirring condition. Afterwards the plating was carried out in a constant temperature water bath at 50° C. and under ultrasonic oscillation condition, and the NaOH solution was dripped at any time to keep the pH value of the electroless plating solution at 11. After the plating was completed, the solid particles were centrifugally separated and washed to neutrality with distilled water, then washed three times with absolute ethanol to obtain BNNS@Ni composite powder; 0.15 g of polyvinylpyrrolidone was weighed and dissolved in 150 mL of absolute ethanol to obtain polyvinylpyrrolidone absolute ethanol solution. Then the BNNS@Ni composite powder was added into the polyvinylpyrrolidone absolute ethanol solution, ultrasonically oscillated and stirred for 10 min to prepare BNNS@Ni suspension, which was sealed for later use.

(4) 38.3 g of α-$Al_2O_3$ powder and 60 g of (W,Ti)C powder were weighed and added into 220 mL of absolute ethanol, respectively, then ultrasonically dispersed and stirred for 20 min to prepare α-$Al_2O_3$ suspension and (W,Ti)C suspension; the two suspensions were mixed, and then 0.5 g of MgO and 0.5 g of $Y_2O_3$ powders were added, ultrasonically dispersed and stirred for 15 min to obtain a multiphase suspension.

(5) The multiphase phase suspension obtained in step (4) was poured into a ball milling tank, added with cemented carbide milling balls according to the weight ratio of ball to material of 11:1, and ball milled for 50 h under the protective atmosphere of nitrogen.

(6) The BNNS@Ni suspension obtained in step (3) was ultrasonic dispersed and stirred for 10 min, added into the ball milling tank in step (5), and ball milling was continued for 3 h under the protective atmosphere of nitrogen to obtain ball milled slurry.

(7) The ball milled slurry obtained in step (6) was dried in a vacuum drying oven at 70° C. for 30 h, and then passed through a 100 mesh sieve to obtain a mixed powder.

(8) The mixed powder obtained in step (7) was loaded into a graphite mold, cold pressed for molding, and put into a vacuum hot-pressing sintering furnace for hot-pressing sintering. The sintering process parameters were: the heating rate was 25° C./min, the holding temperature was 1500° C., the holding time was 15 min, and the hot-pressing pressure was 30 MPa.

According to the tests, the mechanical properties of the self-lubricating ceramic cutting tool material added with BNNS@Ni composite powder prepared in example 6 are: flexural strength 683 MPa, hardness 17.5 GPa, fracture toughness 6.4 MPa·$M^{1/2}$.

The following comparative examples were prepared according to the composition ratio of example 4.

Comparative Example 1: A Self-Lubricating Ceramic Cutting Tool Material Added with Uncoated Hexagonal Boron Nitride Nanosheets The difference from example 4 is that BNNS raw material powder is added instead of BNNS@Ni composite powder, 0.35% of BNNS, and the proportion of the other components is the same as that of example 4.

The preparation method is as follows:

(1) 0.05 g of polyvinylpyrrolidone was weighed and dissolved in 100 mL of absolute ethanol to obtain polyvinylpyrrolidone absolute ethanol solution, then 0.35 g of BNNS powder was added into the polyvinylpyrrolidone absolute ethanol solution to prepare BNNS suspension; 32.65 g of α-$Al_2O_3$ powder and 66 g of (W,Ti)C powder were weighed and added into 200 mL of absolute ethanol, respectively, then ultrasonically dispersed and stirred for 15 min to prepare α-$Al_2O_3$ suspension and (W,Ti)C suspension; The three suspensions were mixed, and then 0.5 g of MgO and 0.5 g of $Y_2O_3$ powders were added, ultrasonically dispersed and stirred for 10 min to obtain a multiphase suspension.

(2) The multiphase suspension obtained in step (1) was poured into a ball milling tank, added with cemented carbide milling balls according to the weight ratio of ball to material of 9:1, and ball milled for 45 h under the protective atmosphere of nitrogen. to obtain ball milled slurry.

(3) The ball milled slurry obtained in step (2) was dried in a vacuum drying oven at 60° C. for 35 h, and then passed through a 200 mesh sieve to obtain a mixed powder.

(4) The mixed powder obtained in step (3) was loaded into a graphite mold, cold pressed for molding, and put into a vacuum hot-pressing sintering furnace for hot-pressing sintering. The sintering process conditions are the same as in step (5) of example 4. The SEM photograph of fracture surface of the obtained self-lubricating ceramic cutting tool material is shown in FIG. 7.

Figure 7:
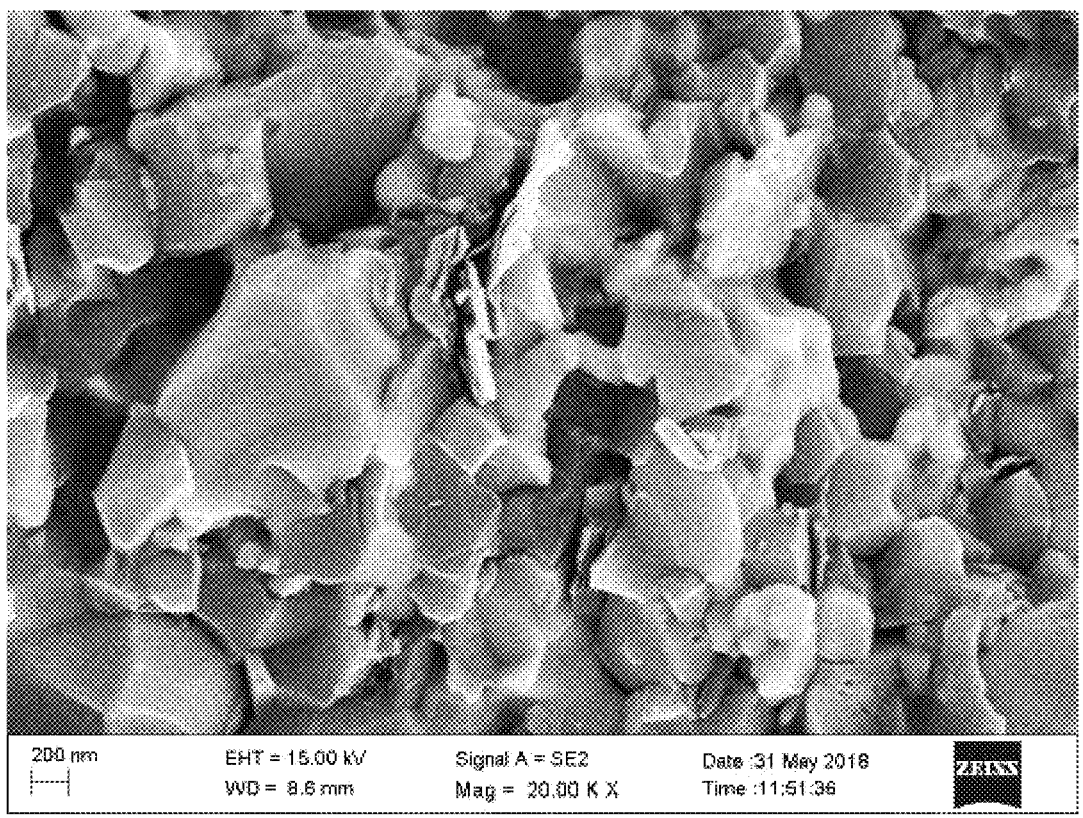
FIG. 7 is SEM photograph of fracture surface of the self-lubricating ceramic cutting tool material added with BNNS powder prepared in comparative example 1.

It can be seen from FIG. 7 that the microstructure of ceramic matrix in the self-lubricating ceramic cutting tool material added with BNNS is relatively uniform and dense, but the BNNS is not closely bounded with the ceramic matrix grains and obvious pores exist. The phenomenon of BNNS being pulled out can also be seen, indicating that the bonding strength between the BNNS and the ceramic matrix is relatively small. According to the tests, the mechanical properties of the self-lubricating ceramic cutting tool materials added with BNNS in comparative example 1 are: flexural strength 735 MPa, hardness 18.1 GPa, fracture toughness 6.0 MPa·$m^{1/2}$.

Comparative Example 2: A Self-Lubricating Ceramic Cutting Tool Material Added with Nickel-Coated Hexagonal Boron Nitride Composite Powder The difference from example 4 is that the BNNS raw material powder of example 4 is replaced by h-BN raw material powder, and the h-BN raw material powder is a commercially available product with an average sheet diameter of 0.5 μm, an average sheet thickness of 100 nm, and a purity of greater than 99%. The mass percentage of each component is: 32.65% of α-$Al_2O_3$, 66% of (W,Ti)C, 0.35% of h-BN@Ni based on the mass of h-BN in the composite powder, 0.5% of MgO, and 0.5% of $Y_2O_3$. The preparation method is the same as that of example 4. The SEM photograph of fracture surface of the obtained self-lubricating ceramic cutting tool material is shown in FIG. 8.

Figure 8:
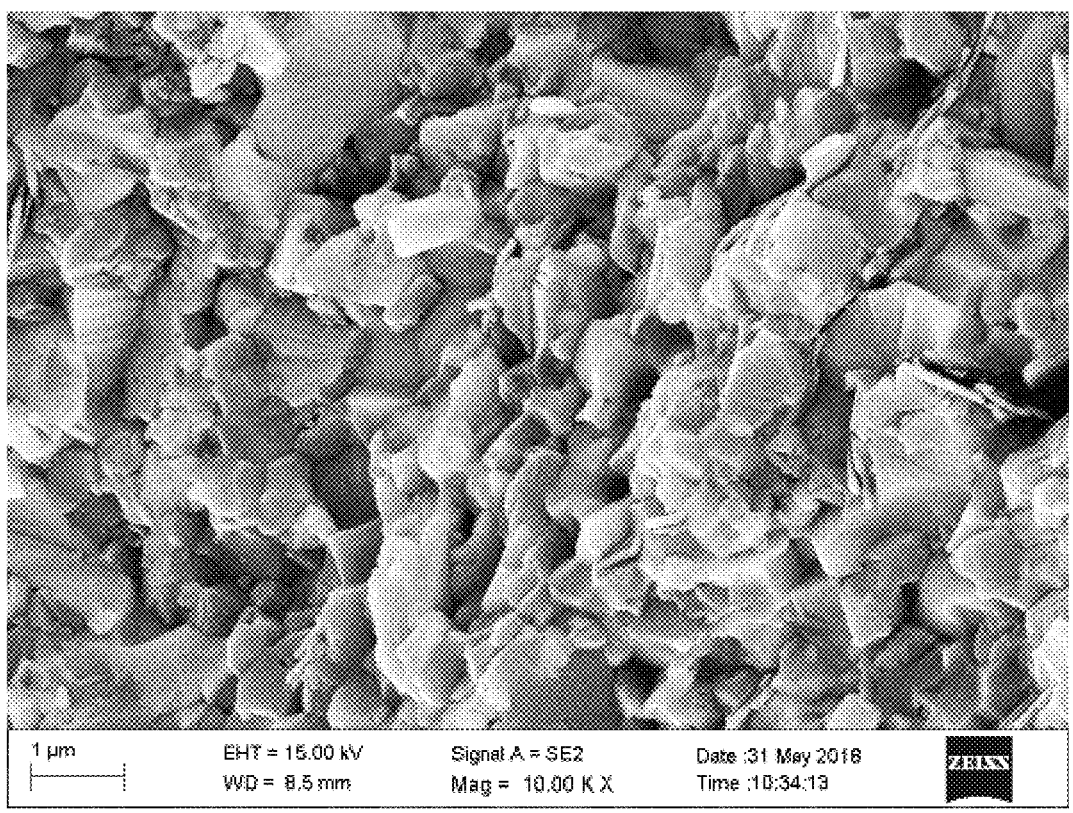
FIG. 8 is SEM photograph of fracture surface of the self-lubricating ceramic cutting tool material added with h-BN@Ni composite powder prepared in comparative example 2.

It can be seen from FIG. 8 that the microstructure of the self-lubricating ceramic cutting tool material added with h-BN@Ni composite powder is relatively uniform and dense, and the h-BN grains are closely bounded with the ceramic matrix grains without obvious pores. According to the tests, the mechanical properties of the self-lubricating ceramic cutting tool material added with h-BN@Ni composite powder prepared in comparative example 2 are: flexural strength 676 MPa, hardness 17.4 GPa, fracture toughness 5.6 MPa·m$^{1/2}$.

What is claimed is:

1. A method for preparing a nickel-coated hexagonal boron nitride nanosheet composite powder (BNNS@Ni) comprising the following steps:
   (1) adding BNNS powder into isopropanol, ultrasonically dispersing for 20-30 min, and then centrifugally separatinge to obtain dispersed BNNS powder;
   (2) adding the dispersed BNNS powder into a sensitizing solution, ultrasonically oscillating and stirring for 10-15 min, centrifugally separating after tin particles in a sensitizing solution are filtered out, and washing once with distilled water to obtain sensitized BNNS powder;
   wherein the sensitizing solution comprises: 10-15 g/L of stannous chloride dihydrate, the balance is isopropanol, and 3-5 g/L of tin particles are added;
   (3) the sensitized BNNS powder obtained in step (2) is added into an activating solution, ultrasonically oscillated and stirred for 10-20 min, centrifugally separated and washed to neutrality with distilled water to obtain activated BNNS powder; then it is added into a PVP solution, ultrasonically oscillated and stirred for 5-10 min to prepare an activated BNNS suspension, which is sealed for later use;
   the components of the activating solution are: 0.2-0.5 g/L of palladium chloride (PdCl$_2$), 5-10 mL/L of concentrated hydrochloric acid, 5-10 mg/L of polyvinylpyrrolidone (PVP), and the balance is distilled water;
   (4) electroless plating solution is prepared, and the components of the electroless plating solution are: 15-25 g/L of nickel sulfate hexahydrate, 50-60 g/L of ethylenediamine tetraacetic acid disodium dihydrate, 40-50 g/L of ammonium sulfate, 15-25 mL/L of a first dose of hydrazine hydrate, 5-10 mg/L of polyvinylpyrrolidone, 0.2-0.5 mg/L of potassium iodide, a pH adjuster that makes the pH value of the electroless plating solution at 10-11, and the balance is distilled water; in addition, 15-25 mL/L of a second dose of equal amount of hydrazine hydrate is prepared for later use;
   the activated BNNS suspension obtained in step (3) is added into the prepared electroless plating solution; first, the plating is carried out for 5-10 min in a constant temperature water bath at 85-90° C. and under ultrasonic oscillation condition, then the second dose of hydrazine hydrate is added dropwise under stirring condition; afterwards the plating is carried out in a constant temperature water bath at 50-60° C. and under ultrasonic oscillation condition, and the pH adjuster is dripped at any time to keep the pH value of the electroless plating solution at 10-11;
   (5) after the plating in step (4) is completed, the solid particles are centrifugally separated and washed to neutrality with distilled water, then washed with absolute ethanol for 2-3 times, and dried in a vacuum drying oven at 30-40° C. for 10-15 h to obtain nickel-coated hexagonal boron nitride nanosheet composite powder.

2. The method for preparing the nickel-coated hexagonal boron nitride nanosheet composite powder as claimed in claim 1, wherein the average particle size of the tin particles in step (2) is 1-2 mm; when the BNNS powder is sensitized in step (2), BNNS powder is added by 1-2 g/L per liter of the sensitizing solution.

3. The method for preparing the nickel-coated hexagonal boron nitride nanosheet composite powder as claimed in claim 1, wherein when the BNNS powder is activated in step (3), the addition amount of BNNS powder is added by 0.5-1 g/L per liter of the activating solution.

4. The method for preparing the nickel-coated hexagonal boron nitride nanosheet composite powder as claimed in claim 1, wherein the concentration of the PVP solution in step (3) is 5-10 mg/L in the distilled water.

5. The method for preparing the nickel-coated hexagonal boron nitride nanosheet composite powder as claimed in claim 1, wherein in step (4), the pH adjuster of the electroless plating solution is NaOH solution with a mass fraction of 7-8%.

6. The method for preparing the nickel-coated hexagonal boron nitride nanosheet composite powder as claimed in claim 1, wherein in step (4), the components of the electroless plating solution are: 20 g/L of nickel sulfate hexahydrate, 55 g/L of ethylenediamine tetraacetic acid disodium dihydrate, 45 g/L of ammonium sulfate, 20 mL/L of the first dose of hydrazine hydrate, 7 mg/L of PVP, 0.3 mg/L of potassium iodide, pH adjuster to makes the pH value of the electroless plating solution 10-11, and the balance is the distilled water; wherein 20 mL/L of the second dose of equal amount of hydrazine hydrate is prepared for later use.

7. The method for preparing the nickel-coated hexagonal boron nitride nanosheet composite powder as claimed in claim 1, wherein the preparation steps of the electroless plating solution in step (4) are as follows:
   1) NiSO$_4$.6H$_2$O and Na$_2$C$_{10}$H$_{14}$N$_2$O$_8$.2H$_2$O are weighed, respectively added into the distilled water, ultrasonically oscillated and stirred for dissolution to obtain NiSO$_4$.6H$_2$O solution and Na$_2$C$_{10}$H$_{14}$N$_2$O$_8$.2H$_2$O solution, respectively;
   2) under ultrasonically oscillating and stirring conditions, NiSO$_4$.6H$_2$O solution is added into Na$_2$C$_{10}$H$_{14}$N$_2$O$_8$.2H$_2$O solution to obtain solution a;
   3) (NH$_4$)$_2$SO$_4$ is added into solution a, ultrasonically oscillated and stirred for dissolution to obtain solution b;
   4) NaOH is added into the distilled water, ultrasonically oscillated and stirred for dissolution to prepare NaOH solution with mass fraction of 7-8%;
   5) under the conditions of ultrasonically oscillating and stirring, the NaOH solution obtained in step 4) is added dropwise to solution b until the pH value reaches 10-11 to obtain solution c;
   6) the first dose of hydrazine hydrate is dripped into the solution c under the conditions of ultrasonically oscillating and stirring, and the distilled water is added to the total volume of the electroless plating solution to obtain solution d;
   7) PVP and KI are added into the solution d successively, ultrasonically oscillated and stirred for dissolution to obtain the electroless plating solution.

8. The method for preparing the nickel-coated hexagonal boron nitride nanosheet composite powder as claimed in claim 1, wherein during the electroless plating in step (4), the BNNS powder is added by 0.2-0.5 g/L per liter of the electroless plating solution.

9. A self-lubricating ceramic cutting tool material added with nickel-coated hexagonal boron nitride nanosheet composite powder, which is prepared by wet ball milling mixing and vacuum hot-pressing sintering with a phase alumina ($\alpha$-$Al_2O_3$) as the matrix, tungsten-titanium carbide ((W,Ti)C) as the reinforcing phase, magnesium oxide (MgO) and yttrium oxide ($Y_2O_3$) as the sintering aids; wherein the nickel-coated hexagonal boron nitride nanosheet (BNNS@Ni) composite powder is used as a solid lubricant;

the mass percentage of each component is: 28-50% of $\alpha$-$Al_2O_3$, 46-70% of (W,Ti)C, 0.2-3% of the nickel-coated hexagonal boron nitride nanosheet composite powder based on the mass of BNNS in the composite powder, 0.4-1% of MgO and 0.4-1% of $Y_2O_3$.

10. The self-lubricating ceramic cutting tool material added with nickel-coated hexagonal boron nitride nanosheet composite powder as claimed in claim 9, wherein the mass percentage of each component is: 30-46% of $\alpha$-$Al_2O_3$, 51-68% of (W,Ti)C, 0.2-1% of BNNS@Ni based on the mass of BNNS in the composite powder, 0.5-1% of MgO, and 0.5-1% of $Y_2O_3$; the sum of the components is 100%; alternatively, the self-lubricating ceramic cutting tool material added with nickel-coated hexagonal boron nitride nanosheet composite powder, wherein the mass percentage of each component is: 32.6-32.7% of $\alpha$-$Al_2O_3$, 65-67% of (W,Ti)C, 0.3-0.4% of BNNS@Ni based on the mass of BNNS in the composite powder, 0.5% of MgO, and 0.5% of $Y_2O_3$; the sum of the components is 100%.

11. A method for preparing the self-lubricating ceramic cutting tool material added with nickel-coated hexagonal boron nitride nanosheet composite powder as claimed in claim 9, comprising the following steps:

(1) preparation of sensitizing solution: stannous dichloride dihydrate is weighed in proportion, added into isopropanol and stirred for dissolution, then the isopropanol is added the sensitizing solution; ultrasonically oscillating and stirring uniformly, sensitizing solution is obtained, and then 3-5 g of tin particles are added;

a BNNS powder is added into isopropanol and ultrasonically dispersed for 20-30 min; after centrifugal separation, the BNNS powder is added into the sensitizing solution, ultrasonically oscillated and stirred for 10-15 min, centrifugally separated after tin particles are filtered out, and washed once with distilled water to obtain a sensitized BNNS powder;

(2) preparation of activating solution: $PdCl_2$ is added into concentrated hydrochloric acid and stirred for dissolution, then distilled water is added to an activating solution; then, polyvinylpyrrolidone is added, ultrasonically oscillated and stirred for dissolution to obtain an activating solution;

the sensitized BNNS powder obtained in step (1) is added into the activating solution, ultrasonically oscillated and stirred for 10-20 min, centrifugally separated and washed to neutrality with distilled water to obtain an activated BNNS powder, and the activated BNNS powder is added into a polyvinylpyrrolidone solution, ultrasonically oscillated and stirred for 5-10 min to prepare an activated BNNS suspension, which is sealed for later use;

(3) the activated BNNS suspension obtained in step (2) is added into the electroless plating solution; first, the plating is performed for 5-10 min in a constant temperature water bath at 85-90° C. and under ultrasonic oscillation condition, then tea second dose of hydrazine hydrate is added dropwise under stirring condition; afterwards the plating is carried out in a constant temperature water bath at 50-60° C. and under the condition of ultrasonic oscillation, and a pH adjuster is dripped at any time to keep the pH value of the electroless plating solution at 10-11; after the plating is completed, the solid particles are centrifugally separated and washed to neutrality with distilled water, and then washed with absolute ethanol for 2-3 times to obtain a BNNS@Ni composite powder; then the BNNS@Ni composite powder is added into polyvinylpyrrolidone absolute ethanol solution, ultrasonically oscillated and stirred for 5-10 min to prepare a BNNS@Ni suspension, which is sealed for later use;

(4) the $Al_2O_3$ powder and (W,Ti)C powder are added into absolute ethanol, respectively, then ultrasonically dispersed and stirred for 15-20 min to prepare an $Al_2O_3$ suspension and a (W,Ti)C suspension; the $Al_2O_3$ suspension and (W,Ti)C-suspensions are mixed, and then MgO and $Y_2O_3$ powders are added, ultrasonically dispersed and stirred for 10-15 min to obtain a multiphase suspension;

(5) the multiphase suspension obtained in step (4) is poured into a ball milling tank, added with cemented carbide milling balls according to the weight ratio of ball to material of 9-12:1, and ball milled for 45-50 h under the protective atmosphere of nitrogen;

(6) the BNNS@Ni suspension obtained in step (3) is ultrasonically dispersed and stirred for 5-10 min, added into the ball milling tank in step (5), and ball milling is continued for 1.5-3 h under the protective atmosphere of nitrogen to obtain a ball milled slurry;

(7) the ball milled slurry obtained in step (6) is dried in vacuum and sieved to obtain a mixed powder;

(8) the mixed powder obtained in step (7) is loaded into a graphite mold, cold pressed for molding, and put into a vacuum hot-pressing sintering furnace for hot-pressing sintering.

12. The method for preparing the self-lubricating ceramic cutting tool material added with nickel-coated hexagonal boron nitride nanosheet composite powder as claimed in claim 11, wherein the concentration of concentrated hydrochloric acid in step (2) is 35-37% by mass.

13. The method for preparing the self-lubricating ceramic cutting tool material added with nickel-coated hexagonal boron nitride nanosheet composite powder as claimed in claim 11, wherein the concentration of hydrazine hydrate in step (3) is 50-80% by mass.

14. The method for preparing the self-lubricating ceramic cutting tool material added with nickel-coated hexagonal boron nitride nanosheet composite powder as claimed in claim 11, wherein the drying and sieving in step (7) is to dry in a vacuum drying oven at 60-70° C. for 30-35 h, and pass through a 100-200 mesh sieve to obtain a mixed powder.

15. The method for preparing the self-lubricating ceramic cutting tool material added with nickel-coated hexagonal boron nitride nanosheet composite powder as claimed in claim 11, wherein the hot-pressing sintering process conditions are: the heating rate is 15-25° C./min, the holding temperature is 1500-1600° C., the holding time is 15-25 min, and the hot-pressing pressure is 25-30 MPa.

* * * * *